United States Patent [19]
Queuille et al.

[11] 3,725,541
[45] Apr. 3, 1973

[54] TREATMENT OF DIARRHEA USING AN INSOLUBLE HOMOPOLYMER OF VINYLPYRROLIDONE

[76] Inventors: Andre Queuille, Noisey-Le-Sec; Raymond Larde, Coubron, both of France

[22] Filed: Jan. 12, 1971

[21] Appl. No.: 105,967

Related U.S. Application Data

[63] Continuation of Ser. No. 738,844, June 21, 1968, abandoned.

[30] Foreign Application Priority Data

June 23, 1967 France..............................67111715

[52] U.S. Cl....................................................424/80
[51] Int. Cl..............................................A61k 27/00
[58] Field of Search...............424/78, 80; 260/88.32

[56] References Cited

UNITED STATES PATENTS

| | | | |
|---|---|---|---|
| 3,224,941 | 12/1965 | Nash et al. | 424/78 |
| 2,658,045 | 11/1953 | Schildknecht | 260/88.3 X |
| 3,336,129 | 8/1967 | Herrett et al. | 424/78 X |
| 3,216,983 | 11/1965 | Shelanski et al. | 424/80 X |
| 2,968,592 | 1/1961 | Curtis | 424/80 |
| 3,073,742 | 1/1963 | Bolz et al. | 424/80 |
| 3,105,007 | 9/1963 | Bodkin | 424/80 |

OTHER PUBLICATIONS

"Polyclar At" Tech. Bulletin Fo–64–2 General Anicine & Film Corp., 1964

*Primary Examiner*—Albert T. Meyers
*Assistant Examiner*—Leonard Schenkman
*Attorney*—Hammond & Littell

[57] ABSTRACT

Novel anti-diarrhea and anti-ulcergenic compositions comprising an effective amount of a water-insoluble polymer or copolymer of vinylpyrrolidone and a pharmaceutical carrier.

2 Claims, No Drawings

TREATMENT OF DIARRHEA USING AN INSOLUBLE HOMOPOLYMER OF VINYLPYRROLIDONE

PRIOR APPLICATION

The present application is a streamlined continuation of our copending application Ser. No. 738,844, filed June 21, 1968, now abandoned.

OBJECTS OF THE INVENTION

It is an object of the invention to provide novel pharmaceutical compositions containing a water-insoluble polymer or copolymer of vinylpyrrolidone as the active ingredient.

It is a further object of the invention to provide a novel method of treating diarrhea in humans and warm-blooded animals.

It is another object of the invention to provide a novel method of treating external ulcers in humans and warm-blooded animals.

These and other objects and advantages of the invention will become obvious from the following detailed description.

THE INVENTION

The therapeutic compositions of the invention are comprised of an effective amount of at least one water-insoluble polymer selected from homopolymers of vinylpyrrolidone polymerized in an alkaline medium to form a cross-linked structure and copolymers vinylpyrrolidone and substituted or unsubstituted vinyl monomers and a major amount of a pharmaceutical carrier. The said compositions may be in the form of tablets, capsules, aromatized powders suspension,, sachets and aromatized granules or ointments.

The compositions may also contain other active ingredients such as antibiotics, i. e. framycetin sulfate, paromomycin sulfate, kanamycin sulfate, gentamycin sulfate, neomycin sulfate, etc., or intestinal antiseptics, i. e. 5-chloro-7-iodo-8-oxyquinoline, benzonaphthol, sulfanilamido-thiazole-formaldehyde hexamethylene tetramine or vitamins, i. e., pyridoxin, biotin or pyridoxal.

The said therapeutic compositions having interesting pharmacological properties, particularly an important anti-diarrhea activity when orally administered and an anti-ulcer activity when administered externally. They may be used for the treatment of infectious or chronic diarrhea caused by infections such as food poisoning, change of diet or excessive use of laxatives, or by diseases of extra-intestinal origin and in particular diarrhea following treatment with antibiotics. They may also be used by external route, in the form of ointments in particular for the treatment and the cicatrization of the sores caused by varicose ulcers. They do not give rise to secondary complaints such as constipation, which is a phenomenon frequently observed with many anti-diarrhea products. Moreover, they have the advantage of being practically non-toxic.

The method of the invention for treating diarrhea in warm-blooded animals comprises orally administering to humans or warm blooded animals a safe but effective amount of at least one water-insoluble polymer selected from homopolymers of vinylpyrrolidone polymerized in an alkaline medium to form a cross-linked structure and copolymers vinylpyrrolidone and substituted or unsubstituted vinyl monomers. The useful daily dose is 50 to 100 mg/kg when orally administered.

The method of the invention for treating external ulcers of humans or warm-blooded animals comprises applying to external ulcers an effective amount of at least one water-insoluble polymer selected from homopolymers of vinylpyrolidone polymerized in an alkaline medium to form a cross-linked structure and copolymers of vinylpyrolidone and substituted or unsubstituted vinyl monomers.

The water-insoluble polymers may be homopolymers of vinylpyrrolidone with a cross-linked structure or copolymers of vinylpyrrolidone with vinyl monomers, substituted or unsubstituted. The preferred polymer is polyvinyl pyrrolidone sold under the mark Polyclar AT which is a light brown solid which is insoluble in water, organic solvents, strong mineral acid and alkalis.

In the following examples, there are described several preferred embodiments to illustrate the invention. However, it should be understood that the invention is not intended to be limited to the specific embodiments.

EXAMPLE I

| Aromatized granules in sachet doses: | Grams |
|---|---|
| Polyvinylpyrrolidone (Polyclar AT) | 4 |
| Citric acid | 0.20 |
| Pluronic F 68 (x) | 0.030 |
| Sodium cyclohexylsulfonate | 0.024 |
| Sodium saccharinate | 0.012 |
| Solid perfumes } Liquid perfumes } | 0.14 |
| Powdered sugar in a sufficient quantity for | 20 |

(x) Pluronic F 68 is a condensation product of ethylene oxide and propylene glycol having a molecular weight of 1,500 to 8,00.

Polyvinylpyrrolidone, citric acid, Pluronic F 68, synthetic sweeteners, the pulverulent fraction of the perfumes and the sugar were admixed in a dry state. The liquid fraction of the perfumes was dissolved in 80° alcohol and this solution was sprayed onto the powdered mixture. The powder was dried in an oven, passed through a sieve and distributed into sachets containing 10 grams each.

EXAMPLE II

| Complex Granules in sachet doses | Grams |
|---|---|
| Polyvinylpyrrolidone | 4 |
| pyridoxal hydrochloride | 1 |
| Biotin | 0.004 |
| Citric acid | 0.20 |
| Pluronic F 68 | 0.030 |
| Sodium cyclohexylsulfonate | 0.024 |
| Sodium saccharinate | 0.012 |
| Solid perfumes } Liquid perfumes } | 0.14 |
| Powdered sugar in sufficient quantity for | 20 |

The preparation of the complex granules was analogous to that of the above simple granules. The granules were distributed in to sachets containing 10 grams each.

EXAMPLE III

| Aromatized sachets - Dose: | Grams |
|---|---|
| Polyvinylpyrrolidone | 6 |
| Polvaromas Ananas | 0.040 |
| Polvaromas Vanilla | 0.200 |
| Avicel RC (Microcrystalline cellulose) | 0.300 |
| Powdered sugar | 3.460 |

Polvaromas Ananas and Polvaromas Vanilla are trade names of aromatic fruit concentrates.

The compositions were prepared by mixing the constituents to obtain an aromatized powder in sachets containing 5 grams each.

EXAMPLE IV

| Granules (in Combination with an Antibiotic) | Grams |
|---|---|
| Polyvinylpyrrolidone | 4 |
| Framycetin sulfate | 0.300 |
| Sodium saccharinate | 0.016 |
| Sodium cyclohexylsulfonate | 0.28 |
| Pluoronic F 68 | 0.180 |
| Citric acid | 0.200 |
| Solid perfumes | 0.120 |
| Quinoline yellow | 0.006 |
| Powdered sugar in sufficient quantity for | 10 |

The preparation of the granules was analogous to that described in Example I and the granules were distributed in sachets containing 5 grams each.

EXAMPLE V

| Granules (in combination with an antiseptic) | Grams |
|---|---|
| Polyvinylpyrrolidone | 4 |
| 5-chloro-7-iodo-8-oxyquinoline | 0.500 |
| Sodium saccharinate | 0.016 |
| Sodium cyclohexylsulfonate | 0.028 |
| Pluronic F 68 | 0.180 |
| Citric acid | 0.200 |
| Solid perfumes | 0.120 |
| Quinoline yellow | 0.006 |
| Powdered sugar in sufficient quantity for | 10 |

The preparation of the granules was analogous to that described in Example I and they are distributed in sachets containing 5 grams each.

EXAMPLE VI

| Ointments | Grams |
|---|---|
| Polyvinylpyrrolidone | 5 |
| Water | 30 |
| Macaloid gel (x) in sufficient quantity for | 40 |

(x) Macaloid is a magnesium and aluminum hexaflurorsilicate.

The polyvinylpyrrolidone was dispersed in 15 cc of water and the polymer was allowed to swell up sufficiently. Once obtained, the soft paste was dispersed in the Macaloid gel and the rest of the water was added to the ointment was distributed in tubes containing 40 grams each.

PHARMACOLOGICAL STUDY

A. "in vitro" Adsorbing activity

The adsorbing activity was determined with many dye-stuffs and the Polyclar AT was compared with "Malethamer," "Gantrez 149" and vegetable charcoal. The indicators used were Acilit (test paper, pH = 0.5 to 5), methylene blue and bromophenol blue.

"Malethamer" is the polymer of maleic anhydride, described in U.S. Pat. No. 3 224 941 and "Gantrez 149" is a copolymer of methylvinylether and maleic anhydride.

1. Effect on Acilit

Acilit paper strips were suspended in 20 cc of water and after thirty minutes of contact, there was obtained a blue solution which was admixed with 100 mg of the product to be studied and allowed to stand for four hours. "Polyclar AT" formed a dark blue precipitate and the pH of the solution was 6.5. "Malethamer" formed a very pale precipitate and the pH of the light green solution was 3.5. "Gantrez 149" formed a viscous mixture and the pH of the medium was 2.5. Consequently, Polyclar AT does not affect the pH, it gives rise to a precipitate and swells up slightly. "Malethamer" gives rise to a mass which swells up and changes the pH slightly. "Gantrez 149" forms a colloidal solution whose pH is very different.

2. Effect on Methylene Blue

An aqueous solution of 50γ/cc of methylene blue at different pH's was used. 200 mg of the products to be studied were added to 20 cc of solution of each pH, the solution was stirred for 30 minutes, filtered and the color of the filtrates and of the precipitates and the pH value were noted. The results are summarized in Table I.

TABLE I

| Products | pH | Color of the Solution |
|---|---|---|
| Control | 4.8 | blue |
| Polyclar AT | 5.2 | slightly blue |
| Vegetable charcoal | 5.2 | decolorized |
| Malethamer | 4.6 | decolorized |
| Gantrez 149 | 2.5 | gel formation |
| Control | 7 | blue |
| Polyclar AT | 6 | blue |
| Vegetable charcoal | 6 | green |
| Malethamer | 5 | slightly blue |
| Gantrez 149 | 2.5 | gel formation |
| Control | 8.4 | blue |
| Polyclar AT | 7.3 | blue |
| Vegetable charcoal | 7.5 | green |
| Malethamer | 5 | slightly blue |
| Gantrez 149 | 2.5 | Gel formation |

3. Effect on Bromophenol Blue

The bromophenol blue was used either as 50γ/cc aqueous solution at different pH or in Oxoid No. 2 medium at pH = 7.3. The results are shown in Tables II and III.

TABLE II

AQUEOUS SOLUTION

| Products | pH | Color of the solution |
|---|---|---|
| Control | 4.8 | violet |
| Polyclar AT | 5.5 | slightly violet |
| Vegetable charcoal | 5.5 | violet |
| Malethamer | 4.5 | dar-yellow |
| Gantrez 149 | 2.5 | formation of a colored gel |
| Control | 7 | violet |
| Polyclar AT | 6.5 | slightly violet |
| Vegetable charcoal | 6.5 | violet |
| Malethamer | 5 | slightly violet |
| Gantrez 149 | 3 | Gel formation |
| Control | 8.4 | violet |
| Polyclar AT | 7.5 | slightly violet |
| Vegetable charcoal | 7.5 | violet |
| Malethamer | 5 | slightly violet |
| Gantrez 149 | 2.5 | Gel formation |
| Control | >12 | violet |
| Polyclar AT | 12 | slightly violet |
| Vegetable charcoal | 12 | violet |
| Malethamer | non-measurable | Gel formation |
| Gantrez 149 | 6.5 | dark-violet viscous liquid |

TABLE III

In Oxoid N. 2 Medium at pH = 7.3

| Products | pH | Color of the solution |
|---|---|---|
| Control | 7.3 | violet |
| Polyclar AT | 7 | slightly violet |
| Vegetable charcoal | 7.3 | violet |
| Malethamer | 4.6 | turns purple |
| Gantrez 149 | 2.5 | turns purple Gel formation |

Tables II and III show that Polyclar AT has an important adsorbing action and practically no effect on pH while Malethamer and Gantrez 149 noticeably lower the pH.

B. "In Vivo" Activity

1. Effect of Polyclar At on the Tied Intestinal Loop of Young Rats Subjected to the Action of a Pathogenic Colibacillus Rats weighing 80 g were fed only with water for 24 hours before the experiment and were kept on this diet for the following 24 hours. After anesthesia with ether and laparotomy, an intestinal loop was tied over a length of 7cm and the ligatured loop was then injected with 0.5 cc of a culture of Escherichia Coli (strain 65/56 — type 0.26 B6, isolated from infantile gastroenteritis) in peptone water at pH = 8.4 The animals were given Polyclar AT at doses of 10 mg and 15 mg and 0.5 cc of the pathogenic culture after the mixture was left in contact for two hours, while the controls only received 0.5 cc of culture. The animals were sacrificed 24 hours after injection and the increase in volume of the tied loop (V), the presence of liquid in the loop (L) and the inflammatory reaction (R) (more or less hemorrhagic appearance of the intestine) were determined. The severity of the condition was ascertained subjectively by a rating of 0 to 4+. The results obtained are summarized in table IV.

Legend:
L = liquid
V = effect on the volume of loop
R = inflammatory reaction

TABLE IV

| | No. of the Animal | Response to Tests | Observations |
|---|---|---|---|
| Controls which did not receive any injection | 1 | V –<br>L –<br>R – | |
| | 2 | V –<br>L –<br>R – | |
| Controls which have received 0.5 cc of pathogenic culture | 3 | V++++<br>L++++<br>R++ | Rigid Abdomen |
| | 4 | V++++<br>L++++<br>R+++ | Rigid Abdomen |
| | 5 | V++++<br>L++++<br>R++ | Rigid Abdomen |
| | 6 | V+++<br>L+++<br>R+++ | Rigid Abdomen |
| | 7 | V+++<br>L+++<br>R++++ | Rigid Abdomen |
| Animals which have received 15 mg of Polyclar AT + 0.5 cc of culture | 8 | V+<br>L+<br>R– | Soft Abdomen |
| | 9 | V+<br>L+<br>R– | Soft Abdomen |
| | 10 | V+<br>L+<br>R– | Soft Abdomen |
| Animals who received 10 mg of Polyclar AT + 0.5 cc of culture | 11 | V±<br>L±<br>R– | Soft Abdomen |
| | 12 | V –<br>L –<br>R – | Soft Abdomen |

In the series of animals which received 0.5 cc of pathogenic culture alone, three out of five were dead at the twelfth hour and the other two rats showed a marked prostration state. This experiment shows the favorable action of Polyclar AT, the adsorption of which is accompanied by a swelling phenomenon permitting withdrawal of the soluble toxins. On the other hand, it has been found that the product under investigation has a very marked "covering" power.

2. Effect of Polyclar AT on the Tied Intestinal Loop of the Male Rat Weighing 300 g. Subjected to the Action of an Enterotoxic Staphylococcus This test was conducted in the same way as the preceding test with anesthesia being effected by intramuscular injection of sodium ethyl-methyl-butyl barbiturate, Nembutal. A strain of hemolytic enterotoxic Staphylococcus aureus (E 58) was used, which had been isolated from a case of food-poisining and cultured on Oxoid No. 2 medium at pH = 7.3. The studied product was added to the culture medium and used either immediately or after a contact of fifteen or ninety minutes and the results were recorded as in the preceding test. The results are shown in Table V.

TABLE V

| | Animals No. | Weight | Test Results | Mode of Use |
|---|---|---|---|---|
| Controls which did not receive any injection in the intestinal loop | 1 | 300g | V–<br>L–<br>R– | |
| | 2 | 320g | V–<br>L–<br>R– | |
| | 3 | 330g | V–<br>L–<br>R– | |
| Controls which received 0.5 cc of the Oxoid No. 2 medium | 4 | 290 g | V–<br>L–<br>R– | |
| | 5 | 310 g | V–<br>L–<br>R– | |
| | 6 | 320 g | V–<br>L–<br>R– | |
| Animals which received 15 mg of Polyclar AT and 0.5 cc of the sterile Oxoid No. 2 medium | 7 | 310 g | V–<br>L–<br>R– | Extemporaneous mixture |
| | 8 | 290g | V–<br>L–<br>R– | Same |
| | 9 | 320g | V–<br>L–<br>R– | Contact 1.30 h |
| | 10 | 310g | V–<br>L–<br>R– | Contact 1.30 h |
| Animals which received 0.5 cc of the pathogenic culture alone | 11 | 360g | V++++<br>L++++<br>R++ | |
| | 12 | 330g | V++++<br>L++++<br>R+++ | |
| | 13 | 300 g | V++++<br>L++++<br>R++++ | |
| Animals which received 15 mg of Polyclar AT and 0.5 cc of pathogenic culture | 14 | 300g | V+<br>L+<br>R+ | Extemporaneous Mixture |
| | 115 | 290g | V–<br>L–<br>R– | Contact 1.30 h |
| | 16 | 310g | V–<br>L–<br>R– | Contact 1.30 h |

Table V shows that Polyclar AT does not exhibit any aggressiveness towards the mucous membrane of the tied intestinal loop.

3. Effect of Polyclar AT on the Tied Intestinal Loop of the Young Rat, Subjected to the Action of a *Proteus mirabilis* Culture This test was conducted in the same fashion as the two previous tests using a *Proteus mirabilis* strain, isolated from a hemoculture in a patient suffering from endocarditis and cultured in an Oxoid No. 2 medium at pH = 9. The product under investigation was added to the culture medium and left in contact for 2 hours. The results are shown in Table VI.

TABLE VI

| | Animals No. | Mortality in 24 hrs. | Appearance of animals Before autopsy | Test results | Observations |
|---|---|---|---|---|---|
| Controls which Received 0.5 cc of the medium Oxoid No. 2 | | | | V+++ | |
| | 1 | 8 h | back paws extended | L+++ R+++ | Peritonitis + |
| | 2 | <22 h | identical | V+++ L++ R++ | Peritonisis ++ |
| | 3 | <22 h | identical | V+++ L+++ R+++ | Peritonitis +++ |
| | 4 | <22h | identical | V+++ L+++ R++ | Peritonitis ++ |
| | 5 | <22h | identical | V+++ L+++ R++ | Peritonitis +++ |
| | 6 | Alive | | V++++ L++++ R+++ | Peritonitis +++ |
| Animals which received 20 mg of Polyclar AT and 0.5 cc of culture | 7 | <22 | | V++ | |
| | 8 | Alive | very good appearance and Vitality | L++ R− V++ L++ R− | |
| | 9 | <22 | Back paws extended | V++++ L++++ R− | Peritonitis + |
| | 10 | Alive | very good appearance and vitality | V+++ L+++ R− | |
| | 11 | Alive | very good appearance and vitality | V++ L++ R− | |
| | 12 | Alive | very good appearance and vitality | V++ L++ R− | |

Table VI shows the good activity of Polyclar AT since 4 animals out of 6 are still living and exhibit a very good general condition.

4. Effect of Polyclar AT on the Tied Intestinal Loop of the Young Rat, Subjected to the Action of a Candida Albicans Culture Male rats weighing about 75 g were subjected to a semilactic diet for 24 hours before injection and kept on this diet for 24 hours of experiment. After anesthesia with ether and laparatomy, an intestinal loop was tied over a length of 7 cm. The intestinal loop was then injected with 0.5 cc of an 18-hour culture of Candida albicans (strain no. 12, isolated from surgical bile) in Sabouraud medium. The animals were given either 0.5 cc of culture medium alone, either a mixture of 15 or 20 mg of Polyclar AT and 0.5 cc of culture, brought into contact for one hour. The animals were sacrificed 24 hours after injection. The test was effected in comparison with animal charcoal and vegetable charcoal, administered under the same experimental conditions at doses of 15 and 20 mg. The results are shown in Table VII.

TABLE VII

| | Animals No. | Mortality in 24 hours | Appearance of animals before autopsy | Test results | Observations |
|---|---|---|---|---|---|
| Controls which did not receive any injection | 1 | Alive | Normal appearance and vitality | | |
| | 2 | do | do | | |
| Animals which have received 0.5 cc. of pathogenic culture | 3 | <22 | Back paws extended | V++++ L++++ R++ | Peritonitis +++. Rigid abdomen. |
| | 4 | 23 | do | V+++ L+++ R++++ | Peritonitis +++. |
| | 5 | Alive | Bad general condition | V+++ L+++ R++++ | Peritonitis +++. Rigid abdomen. |
| | 6 | <22 | Back paws extended | V+ L+ R+ | Peritonitis +++. |
| | 7 | <22 | do | V+++ L++ R+ | Peritonitis +++. |
| Animals which receive 0.5 cc. of culture and 15 mg. of Polyclar At | 8 | Alive | Normal appearance and vitality | V+ L+ R− | Peritonitis +. Soft abdomen. |
| | 9 | do | do | V+ L+ R− | Peritonitis +. Soft abdomen. |
| | 10 | 24h | | V− L− R− | Soft abdomen. |
| Animals which received 0.5 cc. of culture and 20 mg. of Polyclar AT | 11 | Alive | Normal appearance and vitality | V+ L+ R− | Peritonitis ++. Soft abdomen. |
| | 12 | 24h | | V++ L+ R+ | Peritonitis +. Soft abdomen. |
| | 13 | Alive | Normal appearance and vitality | V++ L+ R− | Soft abdomen. |

TABLE VII—Continued

| | Animals No. | Mortality in 24 hours | Appearance of animals before autopsy | Test results | Observations |
|---|---|---|---|---|---|
| Animals which received 0.5 cc. of culture and 15 mg. of animal charcoal | 14 | 22h | | V+ L+ R+ | Peritonitis +++. |
| | 15 | 24h | Back paws extended | V+++ L+++ R— | Peritonitis +++. Rigid abdomen. |
| Animals which received 0.5 cc. of culture and 20 mg. of animal charcoal | 16 | 24h | | V+++ L+++ R+++ | Peritonitis ++. |
| | 17 | Alive | Rather mediocre general condition | V++ L++ R— | |
| Animals which received 0.5 cc. of culture and 15 mg. of vegetable charcoal | 18 | 22h | Back paws extended | V+++ L+++ R+ | Peritonitis +++. |
| | 19 | 22h | | V++++ L++++ R+ | Peritonitis +++. |
| Animals which received 0.5 cc. of culture and 20 mg. of vegetable charcoal | 20 | Alive | General condition affected | V++ L++ R++ | Peritonitis ++. |
| | 21 | 20h | Back paws extended | V+++ L+++ R+ | Peritonitis ++. |

NOTE.—This table shows the good activity of Polyclar AT, whereas animal charcoal and vegetable charcoal have no effect. The survival of 4 animals out of 6 is noted and it has been found that their vitality was practically normal at the 24th hour.

5. Effect of Polyclar AT on the Tied Intestinal Loop of the Rabbit, Subjected to the Action of a Hemo-litic Enterotoxic Staphilococcus aureus Male rabbits, isolated in an individual cage, were fed only with water for 24 hours and kept on this diet for the 24 hour experiment. After anesthesia by intravenous injection of sodium ethyl-methyl-butyl barbiturate, Nembutal and laparotomy, an intestinal loop was tied over a length of 10 to 12 cm. The tied loop was then injected with 1 cc of an 18 hour culture of enterotoxic hemolitic Staphylococcus aureus (strain E 58) in Oxoid No. 2 medium at pH: 7.3. The studied product was admixed with the pathogenic culture and injected immediately thereafter in the intestinal loop at the dose of 30 mg. The animals were sacrificed 24 hours after injection. The recording was made as in test No. 1 and in addition, an eventual peritoneal reaction was looked for. The test was effected in comparison with "Malethamer" and "Gantrez 149." The results are shown in Table VIII.

TABLE VIII

| | | |
|---|---|---|
| Controls without any injection in the ligatured loop | Animals No. 1 | No. 2 |
| Weight | 2.150 kg | 2.300 kg |
| Test Results | V— L— R— | V— L— R— |
| Peritoneal Reaction | None | None |
| Controls which received 1 cc of Oxoid No. 2 medium | Animals No. 3 | No. 4 |
| Weight | 2.100 kg | 2.200 kg |
| Test Results | V— L— R— | V— L— R— |
| Peritoneal Reaction | None | None |
| Animals which received 30 mg of Polyclar AT and 1 CC of pathogenic culture | Animals No. 5 | No. 6 |
| Weight | 2.050 kg | 2.200 kg |
| Test results | V— L— R— | V— L— R— |
| Peritoneal reaction | None | None |
| Malethamer | Animal No. 7 | |
| Weight | 1.850 kg | |
| Test results | V+ L+ R++ | |
| Peritoneal reaction | + | |
| Gantrez 149 | Animal No. 8 | |
| Weight | 1.950 kg | |
| Test results | V+++ L+++ R+++ | |
| Peritoneal reaction | +++ | |

Table VIII shows that Polyclar AT is well tolerated by the tied intestinal loop and does not give rise to any irritant action.

On the other hand, the comparison products give rise to very marked reactions. In a second test, a dose of 50 mg of Polyclar AT was administered after a contact time of an hour and a half with 1 cc of staphylococci culture in Oxoid No. 2 medium before injection in the intestinal loop. The results are shown in Table IX.

TABLE IX

| Batches | Animals No. | Weight | Mortality in 24 hrs. | test results | Peritoneal Reaction |
|---|---|---|---|---|---|
| Controls which did not receive any injection | 9 | 2.100 kg | alive | V— L— R— | None |
| Controls receiving 1 cc pathogenic culture | 10 | 2.100 kg | 20 h | V+++ L+++ R+ | +++ |
| | 11 | 2.300 kg | 21 h | V++ L++ R++ | +++ |
| | 12 | 2.200 kg | alive | V++++ L++++ R+ | +++ |
| | 13 | 2.100 kg | alive | V++++ L++++ R++++ | ++++ |
| Polyclar AT 50 mg + 1cc of pathogenic culture | 14 | 2.400 kg | 20 h | V— L— R— | |
| | 15 | 2.400 kg | alive | V— L— R— | |
| "Malethamer" 30 mg + 1cc pathogenic culture | 16 | 2.250 kg | 18h | V++ L++ R— | +++ |
| "Malethamer" 50 mg + 1 cc pathogenic culture | 17 | 2 kg | 20 h | V++ L+ R± | +++ |
| Gantrez 149 30 mg + 1 cc | 18 | 2kg | alive | V++ R++ | |

| | 19 | 1.800 kg | 19 hr | V++++ | R++ | ++ |
| pathogenic culture Gantrez 194 50 mg + 1 cc of pathogenic culture | 20 | 2.050 kg | alive | V++ R++ | | |

Table IX shows that Polyclar AT avoids any peritoneal reaction, whereas animals treated with Malethamer died in 18 and 20 hours and exhibited an important peritoneal reaction. With Gantrez 149, the effect was uneven and hardly comparable to the other products and practically inefficient because the culture and the product form a "gel."

Conclusion

Polyclar AT is always well tolerated at all doses and protected the tied intestinal loop against an aggression with inflammatory reaction. Furthermore its covering "power" is important.

C: Clinical Tests

Polyclar AT was administered at doses of 2 to 3 sachets containing 2 g of Polyclar AT per day to different patients suffering from intestinal infections and their case histories are presented in Table X.

reports a distinct attenuation of the "stomach burning." On the 5th day of the treatment, rings of tapeworm appear in the stools.

General Tolerance: Good — no secondary effects.

OBSERVATION B

Age: 31 Sex: M Diagnosis: Urethra Gonoccus (antibiotherapy) Clinical State before Treatment: In this case the patient, who habitually reported digestive accidents at the same time of undergoing a treatment with antibiotics and for whom Polyclar AT was prescribed, at the exact same time of an antibiotherapy for urethra gonococcus.

Two sachets of Polyclar AT per day for 6 days were prescribed. Accompanying treatment: antibiotics. Therapeutic result: The antibiotherapy did not cause any secondary reaction. General tolerance: good. Conclusion: very good result.

OBSERVATION C

Age: 40 Sex: M Diagnosis: Tonsillitis (Antibiotherapy) Clinical State before Treatment: In this case, Polyclar AT was prescribed in order to prevent

TABLE X

| Patient | Diagnosis | Dosage | Results | Tolerance. |
| --- | --- | --- | --- | --- |
| 1 | Transverse colitis with outbreak of diarrhea 4 to 5 stools per day. Transverse colon sensible to palpation. | 3 sachets per day | Very good, disappearance of diarrhea in 24 h. and of colic pains. | Good. |
| 2 | Spasmodic colitis in a patient with dolichosigmoid; permanent abdomen pains for 3 months with inappetence, nausea without diarrhea but perturbed intestinal transit. | 2 sachets per day for 10 days. | Very marked improvement after 3 days, disappearance of the painful colic syndrome and regularization of intestinal transit. | Do. |
| 3 | Diarrhea caused by imbalance of the intestinal microbial flora of a patient treated for 8 days with antibiotics for dental infection (diarrhea refractory to lactic ferments taken at high doses. | 2 sachets per day | Excellent: cessation of diarrhea in 48 hr. in spite of the continuation of antibiotic treatment. | Do. |
| 4 | Gastrointestinal influenza with vomiting and diarrhea. | do | Very good result; complete disappearance of the disturbances on the second day. | Do. |
| 5 | Chronic colitis with alternating diarrhea and constipation in a beer drinker. Actually in diarrheaic period, painful colon. | 2 sachets then 3 sachets per day. | Incomplete result with 2 sachets. Very good results with 3 sachets per day; 1 stool per day, normal disappearance of the painful syndrome. | Do. |
| 6 | Diarrhea (2 liquid stools per day) of a convalescent from icterus, which dates back to 3 months. | 2 sachets per day | Excellent. Improvement at the 24th hour. Normal stools on the 2nd day. | Do. |
| 7 | Diarrhea for 5 days after influenza episode, postprandial stools. | do | Cessation of diarrhea in 48 h. The improvement was evident after 24 hr. | Do. |
| 8 | Chronic entero-colitis following dysentery in an ancient prisoner of war. Now 3 to 10 stools per day. No effect of the usual therapeutics. | 3 sachets per day for 10 days. | Improvement beginning after a certain displacement about on the third, 4th day. One stool per day at the 8th day of treatment. Excellent result for the patient, because the other treatments failed. | Nausea after intake of the first sachet. |
| 9 | Hiatal hernia known for 3 years. Actually pyrosis 1 to 2 hours after meals and also by night. | do | Marked effect on pyrosis from the third day. Improvement gets evident with continuation of treatment. | Mild nausea after intake of the first sachets. |
| 10 | Gastritis showing itself essentially by pyrosis. Radio show a gastritis with big creases of the stomach. | do | Favourable effect on the gastric burns from the 48th hour. Improvement after continuation of the treatment. | Good. |
| 11 | Diarrhea (5 to 6 liquid stools per day) in a chronic colitic. | 3 sachets per day | Excellent. Regularization of intestinal transit in 36 h. | Do. |
| 12 | Food poisoning unaffected by usual treatment (bismuth, lactic ferments, coal) 3 liquid stools per day, abdominal pains. | do | Regularization of intestinal transit after 2 days, and disappearance of painful syndrome. | Do. |
| 13 | Hiatal hernia, radiologically confirmed and showing itself by pyrosis, epigastric swelling. Pains in the night with eructation at about one o'clock in the morning. | 3 sachets per day for 10 days. | Very marked improvement occurring progressively about the 4th, 5th day of treatment and increasing from that time. | Do. |

NOTE.—Table X shows that Polyclar AT exhibits an important antidiarrheaic activity on diarrhea of different origins and that it has an interesting therapeutic activity in certain gastric inflammatory conditions.

OBSERVATION A. Age: 49 Sex: M Diagnosis: Gastrocolitis.

Clinical State before Treatment: For 2 months, the patient had reported gastralgiae of the type of burns occurring approximately 3 hours after every meal. Furthermore, a diarrhea of 3 liquid fecal evacuations per day existed. A treatment with bismuth had been instituted, but without any result. Polyclar AT was prescribed, 3 sachets per day for 6 days.

Therapeutic result: During these 6 days the patient had only 2 well-shaped bowel movements per day. He possible digestive troubles of the antibiotherapy on a patient who reported a tonsillitis of the left side developping towards an abscess and made the taking of TETRACYCLINE necessary. Dosage : 1 sachet of Polyclar AT per day for 4 days. Connected treatment : antibiotic. Therapeutic result : a healing of the tonsillitis is observed as well as a total absence of digestive troubles. General tolerance : very good result.

OBSERVATION D

Age : 23 Sex M Diagnosis : Acute colitic episode on the basis of a chronical gastritis. Clinical state before treatment : This patient suffered from gastralgia occuring exceptionally but at regular times, accompanying regurgitations. Actually it has appeared for two days in form of 7 to 8 bowel movements per day and at the same time he complained about dizziness. Upon palpation, the abdomen was soft with a sensitive zone on the left side. Dosage : 2 sachets of Polyclar AT per day for 3 days. Therapeutic result : 3 days of treatment with Polycalr AT led to a total disappearance of the gastrointestinal troubles. The patient only complained about dizziness and had a slight fever of 38.1°C. No secondary constipation. The treatment with antibiotherapy was continued and lactic ferment added. General tolerance : Good tolerance, no secondary effects. Conclusion : Good result.

OBSERVATION E

Age : 28 Sex : M Diagnosis : Diarrhea of hepato-biliary origin. Clinical state before treatment : This patient reported a diarrhea (2 liquid bowel movements per day) and bilious vomiting very frequently (7 to 8 times in the morning). The clinical examination revealed an abdominal sensibility on the right side. Dosage : 2 sachets of Polyclar AT for 3 days. Therapeutic result : after 24 hours of treatment amelioration was manifest and the disappearance of the troubles on the second day confirmed this excellent result. No secondary constipation has been observed. General tolerance: good. Conclusion: very good result.

OBSERVATION F

Age 52 Sex: M. Diagnosis: Common acute enterocolitis. Clinical State before Treatment: This is a case of a neurotonic patient who reported a diarrhea of 3 liquid bowel movements daily accompanied by colics. Dosage: 2 sachets of Polyclar AT per day during 24 hours. Therapeutic result: After 24 hours, the diarrhea and the colics had stopped only by the administration of Polyclar AT. General tolerance: good, no secondary effects. Good acceptability, "tasting good." Conclusion: very good result.

OBSERVATION G

Age: 55 Sex: M. Diagnosis: Simple Colitis. Clinical State before Treatment: For 8 days, this patient reported a diarrhea accompanied by colic and nausea. The number of bowel movements was 2 to 3 per day. Upon clinical examination, the stomach was soft but swollen and sensitive on the colon passage. The tongue was sabbural. Dosage: 2 sachets of Polyclar AT per day for 4 days. Therapeutic result: After 4 days of treatment, the intestinal rhythm was normal with the disappearance of nausea, colic and diarrhea. The stomach was soft and without pain. General tolerance: good. No secondary effects. The patient stated that the product had an agreeable taste. Conclusion: good result.

OBSERVATION H

Age 43 Sex M Diagnosis: Acute infectious enterocolitis. Clinical state before treatment: This patient suffered from an acute intestinal infection with temperatures up to 39°C for 2 days and a diarrhea with 5 to 6 bowel movements per 24 hours. Moreover, a state of asthenia signified by perspiration was observed, a global anorexia. The diarrhea was accompanied by colics. Upon examination, the tongue was sabbural, the stomach was soft but hurt. Dosage: 2 sachets of Polyclar AT for 9 days. Therapeutic result: within 48 hours, the diarrhea and the colics stopped, the fever disappeared and then the stools became normal. No secondary constipation. Tolerance: Good. The medicine was well accepted by the patient who found it pleasant-tasting. Conclusion: very good result.

OBSERVATION I

Age 18 Sex F. Diagnosis: Secondary colitis upon a laxative treatment. Clinical state before treatment: This young woman with a chronic constipation (1 bowel movement per week) reported a secondary colitis upon a purgation and suffered from colics which were accompanied by diarrhea of 3 bowel movements per day. Dosage: 2 sachets of Polyclar AT per day for 3 days. Therapeutic Result: In spite of taking a laxative within 24 hours, a complete disappearance of the colics and diarrhea were observed. A normalization of the transit and the intestinal fermentations was rapidly established. General tolerance: good. The patient stated that the product had an agreeable taste. Conclusion: very good results.

OBSERVATION J

Age 27, sex M. Diagnosis: Digestive troubles due to antibiotherapy. Clinical state before treatment: Treatment by antibiotherapy for a proceeding pyodermitis of both hands. The patient suffered from abdominal pains of the colic type and it was decided to combine Polyclar AT with the antibiotic doses. Dosage: 2 sachets of Polyclar AT per day for five days. Accompanying Treatment: Antibiotherapy. Therapeutic result. On the first day of the treatment, the patient still reported some colics during the evening, but the next morning the abdominal pains had disappeared. On the 5th day, the amelioration was stable. General Tolerance: Good. The patient stated that the medicine tasted agreeable. Conclusion: very good results.

OBSERVATION K

Sex: M Age 42 Diagnosis: Hiatal hernia-gastritis. Clinical state before treatment: This patient has a hiatal hernia which had been diagnosed 3 years ago and up to the present time was kept calm by the classical bismuth treatment and antispasmodics. But a revival of the pains remained without response to this treatment and while attending a radiographic treatment the patient was submitted to Polyclar AT. Dose: 3 sachets of Polyclar AT per day for 7 days and then interruption for 25 days. Resumption of the treatment at a dosage of 2 sachets per day for 8 days, then 3 sachets after 5 days. Total duration of the treatment 20 days. Therapeutic result: The sedative action of the Polyclar AT was manifest from the first day of the treatment on and for 7 days the patient had not suffered at all, he even had a glass of wine on the second day of the treatment, without having any pain. But on the morning of the interruption of the treatment, the pains re-appeared. The radiological examination which were carried out showed "a pretty large hiatous region without reflux and the absence of gastroduodenal lesions," anatomically the radiology showed an undeniable amelioration. Therefore, it was necessary to continue the taking of Polyclar AT at a dosage of 2 sachets per day. Approximately one month later an important clinical amelioration existed but the initial dosage of 3 sachets per day was resumed due to the persistence of the slight burns. The vomiting followed the slight pains in the morning and the Polyclar AT then did not suffice to keep down this new thrust of the disease. Then the classical treatment was resumed again. General tolerance: good, no secondary effects. Conclusion: good results.

OBSERVATION L

Age 44, Sex M. Diagnosis: Oesoaphogitis of Reflux. Clinical state before treatment: For 3 years, this patient was plagued by an inferior oesaphoganian expansion announcing a megaoesaphogitis and relatively organized cardio spasm (radio-telescopy). In fact, a new painful thrust occurred in the form of nightly pains which lasted for one-fourth hour, occuring once or twice during the night after an abundant meal or after ingestion of mealy food. There were neither belches nor gastric burns. Previously the patient had been treated with bismuth and antispasmodic medicine. It was decided to try Polyclar AT, 2 sachets per day for 19 days. Therapeutic result: After 3 days of treatment the nightly pains disappeared and the evacuation of stomach gases was much easier. The patient digested much faster. It seems that these results were superior to those which were obtained by means of previously administered medicine (bismuth in particular). During the treatment, the patient had not the slightest pain. General tolerance: good; conclusion: good results.

OBSERVATION M

Age: 55 Sex M. Diagnosis ULCUS OF THE LITTLE CURVATURE — GASTRITIS. State before the treatment: This patient who had undergone an operation for a perforated ulcus actually reported an emaciation, insomnia and pains of the type of epigastric burning with sub-costal irradiations on the right side as well as nausea. These pathological phenomena revealed a considerable gastritis. The radiography showed a little ulcerous niche of the angular region of the little curvature of the stomach. Then Polyclar AT was prescribed, together with the recommendation to remain lying on the stomach for one-half hour after every taking of the medicine. Dosage: 3 sachets of Polyclar AT per day for 5 days, then continued for 1 month after an interruption of 8 days followed by 2 sachets per day for 15 days. THERAPEUTIC RESULT: The amelioration had become manifest from the 2d, 3d and the 5th day, that is at the end of the first period of the treatment, the disappearance of the pathological painful phenomena was observed. The only persistent phenomenon, according to the patient was a slight "vexation" in the hepatic region. When, after the end of these 5 days of treatment, the patient was reexamined, he had put on weight, about 2 kg, and had no insomnia. It is important to state that Polyclar AT had no effect on the pre-existing intestinal rhythm (1 bowel movement every two days).

Therefore a treatment requiring 3 sachets of Polyclar AT per day was instituted. Reexamined after 11 days, the patient felt wery well, ate well, and did not have the slightest pain. However, the same slight constipation still existed. On the 19th day of the second period of the treatment, the obtained amelioration was stable and the patient ate everything without experiencing the slightest trouble. Even his intestinal rhythm was normalized ( 1 bowel movement per day). A radiography after ingestion of barium showed normal passage of the oesophagus. The fasting stomach was emptying from the filling. Normal aspect of the gastric curvatures. The deformed duodenal bulb with irregular outlines, without ulcerous niche, was actually visible. The treatment with Polyclar AT was pursued at a rate of 2 sachets per day and at the end of 15 days before the remarkable stability of this amelioration, the administration of the medicine was completely discontinued. A new series of radiographies were carried out 3 weeks after the interruption of the treatment, which was an occasion to make the following commentary: "Normal passage of the esophagus. The stomach no longer contains fasting liquid. It contracts and empties the filling. In vertical position, a little image in spur form, probable scar of an old ulcus, was again found in the angular region. The bulb was irregular without a sign of a niche." General tolerance: good, and very good acceptability of Polyclar AT during the whole treatment. Conclusion: Good results.

OBSERVATION N

Age 51 Sex M Diagnosis: Ulcus of the little curvature — gastritis. Clinical state before treatment: For several months, this patient had re-experienced abdominal pains in the bend, punctuated by meals, occurring at intervals of about 16, 17 hours in the form of cramps, more or less severe and sometimes with nausea and vomiting. These pains were quieted by ingestion of food. He also reported gastralgiae in the form of burning pain with stomach acidity and regurgitations. In addition, he was plagued by lithiasis and arthritis of the right hip. The radiological cliches of the stomach revealed a little ulcerous spur of the little subangular curvature. It was decided on a therapeutic treatment with Polyclar AT, 3 sachets per day for 12 days, then 4 sachets per day for 19 days, 3 sachets per day for 9 days and 2 sachets per day for 15 days with additional antispasmodic during the two last periods of treatment. Therapeutic result: From the 3rd day of treatment on, a slight amelioration was observed having effect on the "-stomach acidities" which were less vivid. The patient reported that his urines were more abundant and tinted. Then the amelioration became distinctly manifest on the 12th day. The digestions were less painful and the regurgitations less frequent. Moreover, the urine had again become normal. The treatment was continued at a rate of 4 sachets per day. When at the end of approximately 3 weeks, the patient was re-examined, his state was stationary; the burning pain and stomach acidities had almost disappeared, but the pains, more vivid, occurring 4 to 5 hours after the meals, remained. Therefore, it was decided to return to 3 sachets of Polyclar AT and to add an antispasmodic. 9 days later, the patient felt very well, most of the troubles had disappeared, the action of the antispasmodic having reinforced that of POLYCLAR AT. The treatment was continued with 2 sachets per day. After this new period of treatment which was carried out for 15 days, the already obtained amelioration had become manifest in spite of transitory appearance of cramps approximately 2 hours after meals. The over-all therapeutic result can be considered very satisfactory in this particularly difficult case and there were clearer fecal evacuations since the beginning of the treatment. General tolerance: good tolerance of the medicine. The patient stated that his fecal evacuations were clearer since the beginning of the treatment without other modification. Conclusion: good results.

OBSERVATION O

Age: 53 Sex: M. Diagnosis: Simple Colitis. Clinical State before treatment: Patient came to the office complaining of abdominal pain for 3 days. Upon examination, above all there existed a distinct sensitivity on the colon passage and the tongue was saburral. The urine and the fecal evacuations were normal. Treatment with Polyclar AT was prescribed, 2 sachets per day for 5 days, then 3 sachets per day for 6 days. Total duration of the treatment: 11 days. Therapeutic result: from the second day of the treatment on, it was evident that a clinical amelioration existed and the pains subsided. Then that state was maintained with some minor mementary colics. General tolerance: good. Conclusion: Good results.

OBSERVATION P

Age 17 Sex M Diagnosis: Digestive troubles due to antibiotherapy. Clinical state before treatment: This young man was treated for infectious juvenile acne of the face. Since local treatment did not bring about any amelioration, antibiotics were administered by oral method. But after one week of treatment, some colics and the emission of slightly diarrheaic bowel movements made necessary the substitution of lactic ferments by Polyclar AT, 3 sachets per day for 3 days. Therapeutic Result: Disappearance of digestive troubles within 24 hours and during the duration of the treatment. General tolerance: good, no secondary effect. Conclusion: very good results.

OBSERVATION Q

Age 54, Sex M. Diagnosis: Ulcus of the Bulb — Gastritis Clinical state before treatment: This patient examined in the office and treated 4 months ago for an ulcus of the bulb with good results had stopped his treatment for one month and one could actually see the resumption of a clinical tableau causing uneasiness and continuous pains with constipation and some regurgitations, however, no burns. The first radiologic cliches after ingestion of baryta showed a sluggish pyrolic passage rendering opaque an irritable bulb with suspicion of centro-residual image. While waiting for the results of the new cliches, it was decided on a treatment with Polyclar AT, 4 sachets per day for 5 days and then interruption for 15 days. After that, 3 sachets per day for 28 days. Therapeutic result: Reexamined in the office 20 days later, the patient, who had only pursued his treatment for some days, therefore without appreciable results, was again placed on Polyclar AT at a dosage of 3 sachets per day. At this moment, the radiography did not show ulcerous signs. After 8 days, the patient reported the progressive disappearance of his troubles within the first 3 days after the resumption of the treatment. A detail to be stated: the clearer color of the fecal evacuations. After that Polyclar AT was continued for 20 days. During this period, the patient had reported a painful crisis which only lasted for 1 day as a consequence of a great vexation. It was a case of vivid pains with hypersensibility of the epigastric region upon palpation. The patient estimated that the sedative effects of Polyclar AT were superior to those of the classical medicines (bismuth in particular). General tolerance: good, with the emission of clearer fecal evacuations during treatment with POLYCLAR AT. Conclusion: Good results.

Various modifications of the compositions and method of the invention may be made without departing from the spirit or scope thereof, and it is to be understood that the invention is to be limited only as defined in the appended claims.

We claim:

1. A method of treating diarrhea in humans or warm-blooded animals comprising orally administering to humans or warm-blooded animals an amount effective to control diarrhea therein of a water-insoluble homopolymer of vinylpyrrolidone polymerized in an alkaline medium to form a cross-linked structure, said homopolymer occurring as a solid insoluble in water, organic solvents and strong mineral acids and alkalis.

2. The method of claim 1 wherein the effective daily amount is 50 to 100 mg/kg.

* * * * *